United States Patent [19]

Baratz et al.

[11] Patent Number: 4,873,517
[45] Date of Patent: Oct. 10, 1989

[54] METHOD FOR SELECTING LEAST WEIGHT END NODE TO END NODE ROUTE IN A DATA COMMUNICATIONS NETWORK

[75] Inventors: Alan E. Baratz, Chappaqua, N.Y.; Kathryn E. Clarke, Little Silver, N.J.; Melinda R. Pollard, Raleigh, N.C.; Diane P. Pozefsky, Chapel Hill, N.C.; Lee M. Rafalow, Durham, N.C.; William E. Siddall; James P. Gray, both of Chapel Hill, N.C.

[73] Assignee: International Business Machines Corporation, Armonk, N.Y.

[21] Appl. No.: 210,273

[22] Filed: Jun. 23, 1988

[51] Int. Cl.⁴ .................. H04Q 11/04; H04L 11/20
[52] U.S. Cl. .................. 340/825.030; 340/827; 379/220; 370/54
[58] Field of Search ............ 340/825.03, 826, 827; 370/94, 54, 58; 379/220, 221; 364/514

[56] References Cited

U.S. PATENT DOCUMENTS 4,317,193  2/1982  Joel, Jr. .................. 370/54
4,320,500  3/1982  Barberis et al. .......... 370/94
4,748,660  5/1988  Deveze .................... 364/514

FOREIGN PATENT DOCUMENTS 0027449  2/1983  Japan .................... 370/94

*Primary Examiner*—Donald J. Yusko
*Assistant Examiner*—E. O. Pudpud
*Attorney, Agent, or Firm*—Gerald R. Woods

[57] ABSTRACT

When computing a least weight path from an origin node to a destination node in a data communication network, a route-computing network node uses information provided by the origin and destination nodes to compute least weight routes from those nodes to adjacent network nodes. The route-computing network node uses information in the topology database to compute least weight routes from network nodes adjacent the origin node to network nodes adjacent the destination node. The results of the computations are concatenated to determine an optimum route from the origin node to the destination node. The topology database need not include information about the transmission groups connecting the origin/destination nodes to network nodes.

6 Claims, 3 Drawing Sheets

FIG. 4
NN-NN ROUTES

| POTENTIAL ROUTE | WEIGHT | SELECTED |
|---|---|---|
| A-B-D | 14 | YES |
| A-E-D | 16 | NO |
| A-B-C-F-D | 27 | NO |
| A-E-D-F-D | 24 | NO |
| A-B-D-F | 22 | NO |
| A-B-C-F | 18 | YES |
| A-E-D-B-C-F | 24 | NO |
| B-D | 10 | YES |
| B-A-E-D | 19 | NO |
| B-C-F-D | 23 | NO |
| B-C-F | 14 | YES |
| B-D-F | 18 | NO |
| B-A-E-D-F | 27 | NO |

FIG. 5

| ORIGIN EE-NN WEIGHT | NN-NN WEIGHT | DEST EN-NN WEIGHT | TOTAL ROUTE WEIGHT |
|---|---|---|---|
| 1 | 14(A→D) | 4 | 19 |
| 1 | 18(A→F) | 2 | 18 |
| 2 | 10(B→D) | 4 | 16 |
| 2 | 14(B→F) | 2 | 18 | ized in other than general terms.
METHOD FOR SELECTING LEAST WEIGHT END NODE TO END NODE ROUTE IN A DATA COMMUNICATIONS NETWORK

FIELD OF THE INVENTION

The present invention relates to communications networks and more particularly to a method of selecting a least weight route between two end nodes in the network.

For purposes of the following descriptions, a communications network can be generally defined as a collection of network nodes and end nodes interconnected through communications links. A network node can be characterized as a data processing system that provides certain functions within the network, such as routing of messages between itself and its adjacent or neighboring nodes, selection of routes for messages to be transmitted between two nodes and the furnishing of directory services to connected end nodes. The link between nodes may be permanent communications links such as conventional cable connections or links that are enabled only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one end node to exchange data with another user at another end node, a path or route must be set up through the network. The route will include the end node at which the first user is located (the origin end node), the end node at which the second user is located (the destination end node), possibly one or more network nodes and the links or transmission groups which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability and with complete security regardless of how many nodes and transmission groups might be included in the route between the two users. Unfortunately, real data communications networks lack these ideal characteristics. Varying amounts of delays may be introduced over different routes. Some types of transmission groups may cost more to use or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups and to use the assigned weights in computing an optimal or least weight route through the network from one user to another. The weight generally reflects how closely a given node or transmission group meets a predetermined standard of performance. For example, if weights were to be assigned on the basis of delay characteristics alone, a high-delay transmission group would have a greater assigned weight than a low-delay transmission group.

In determining a "best" route through a network from a first user at one end node to a second user at another end node, the weight of nodes and transmission groups in various potential routes are summed. The route having the lowest total weight, which is understandably referred to as the least-weight route, is considered to be the "best" route between the users.

The basis on which weights are assigned to nodes and transmission groups and the algorithms that compute optimal routes based on those weights are not essential to an understanding of the invention and are not described in other than general terms.

As indicated above, route computation is performed at a network node. The network node must have access to the characteristics or weights of the various nodes and transmission groups in the network. This information takes the form of a topology database stored at the node.

In a typical data communications network, the number of network nodes is considerably less than the number of end nodes connected to those network nodes. If the topology database must include information about the end nodes and the transmission groups which connect those end nodes to the network nodes, the database will necessarily be larger and more complex than if the database were to include information only about the network nodes and the transmission groups interconnecting the network nodes.

DISCLOSURE OF THE INVENTION

The present invention is a method for allowing a network node to calculate an optimal end node to end node route through a network when the network topology database maintained at the network nodes contains only information about network nodes and transmission groups interconnecting those nodes.

When a first user requests that a path be established through the network to a second user, information as to the characteristics of the transmission groups connecting both users' end nodes to network nodes is furnished by the users' end nodes to the network node responsible for the route computation. This network node calculates an optimal route through the network in a staged process. First, the information received from the end nodes is used to calculate optimal routes from the end nodes to all network nodes to which those end nodes are connected. Next, the network node uses information stored in its own network topology database to calculate optimal routes from a first set of network nodes to a second set of network nodes. The first set of network nodes is all network nodes connected to the first user's end node. The second set of network nodes is all network nodes connected to the second user's end node. The results of the end node-to-network node calculations and network node to network node calculations are concatenated or combined to determine the optimal end node to end node route through the network.

There is a significant advantage to computing the optimal route through the network (network node to network node) separately from the optimal route from the user end nodes to their adjacent network nodes. In a typical network, the number of end nodes is considerably greater than the number of network nodes. Single step end node to end node route computations, as are performed in some prior art systems, requires that information about the transmission groups between end nodes and their adjacent network nodes be included in the topology database stored at the network node performing the computation. This, of course, increases the amount of memory that must be allocated to storage of the topology database. Moreover, since each network node stores its own copy of the database and updates that database by sending and receiving topology database messages to every network node to which it is connected, storing end node transmission group information in the topology database would significantly increase the amount of information that must be included in topology database update messages broadcast through the network.

While the specification concludes with claims particularly pointing out and distinctly claiming that which is regarded as the present invention, details of a preferred embodiment of the invention may be more readily ascertained from the following technical description when read in conjunction with the accompanying drawings wherein:

FIG. 4 is a table of potential network node to network node routes for the network illustrated in FIG. 1; and FIG. 5 is an additional table illustrating the computation of an optimal end node to end node route through the network shown in FIG. 1.

TECHNICAL DESCRIPTION

Figure 1:
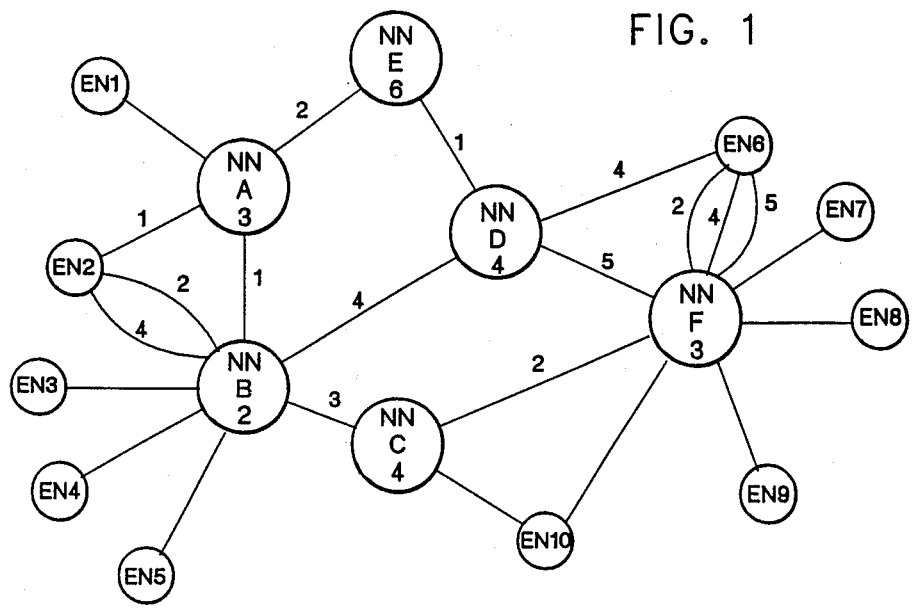
FIG. 1 is a network map showing network nodes (NNs) and end nodes (ENs)

Referring to FIG. 1, the illustrated network includes a plurality of network nodes NNA, NNB, NNC, NND, NNE and NNF. The various network nodes are interconnected by transmission groups illustrated only as single lines. A number of end nodes EN1 through EN10 are connected to various ones of the network nodes. Certain end nodes may be connected to more than one network node and/or may have parallel transmission groups to the same network node. For example, end node EN2 is connected to both network node NNA and NNB with two parallel transmission groups to network node NNB. Similarly, end node EN6 is connected to both network nodes NND and NNF with three parallel transmission groups to node NNF.

As mentioned above, weights are assigned to each transmission group and network node in the network. These weights represent the "cost" of using the node or transmission group to transmit data. In the figure, the weights are represented by numerals either appearing within the symbol for the network node or adjacent the line representing the transmission group connecting the network nodes. The weight values themselves appearing in the figure are arbitrarily selected for purposes of illustration and should not be interpreted as actual numerical values that would be assigned in a typical data communications network. The figure also shows weights assigned to transmission groups connecting end nodes to their adjacent network nodes. While the weights assigned to the end node transmission groups are known to the end nodes, they may not be known to the network nodes if the network nodes maintain a topology database containing only information about the network nodes themselves and the transmission groups which interconnect the network nodes. While the information stored in the network nodes is adequate to allow the network nodes to compute optimal routes between any two network nodes, it is not adequate to permit a network node to compute an optimal route between two end nodes.

Figure 2:
FIG. 2 is a time-based chart of steps taken to furnish end node transmission group information to a network node performing a route computation.

To allow a network node to compute an optimal end node to end node route, information about the transmission groups connecting the end nodes to adjacent network nodes must be made available to the network node responsible for the route computation. The process for making such information available is described with reference to FIG. 2, a time-based chart of messages which flow through the network when a user located at an end node EN2 desires to communicate with a user located at end node EN6. The origin end node EN2 sends a message unit (MU) to the network node NNB having responsibility for providing routing services to EN2. The message includes information or vectors about the transmission groups which connect EN2 to both NNA and NNB. The transmission group vectors are saved at NNB and the message is forwarded through the network via nodes NNC and NNF to end node EN6. End node EN6 responds with a message unit reply (MUR) including information about the transmission groups which connect end node EN6 to its two adjacent network nodes, NND and NNF. The reply is forwarded through the network to the serving network node NNB, which saves the destination transmission group vectors.

Figure 3:
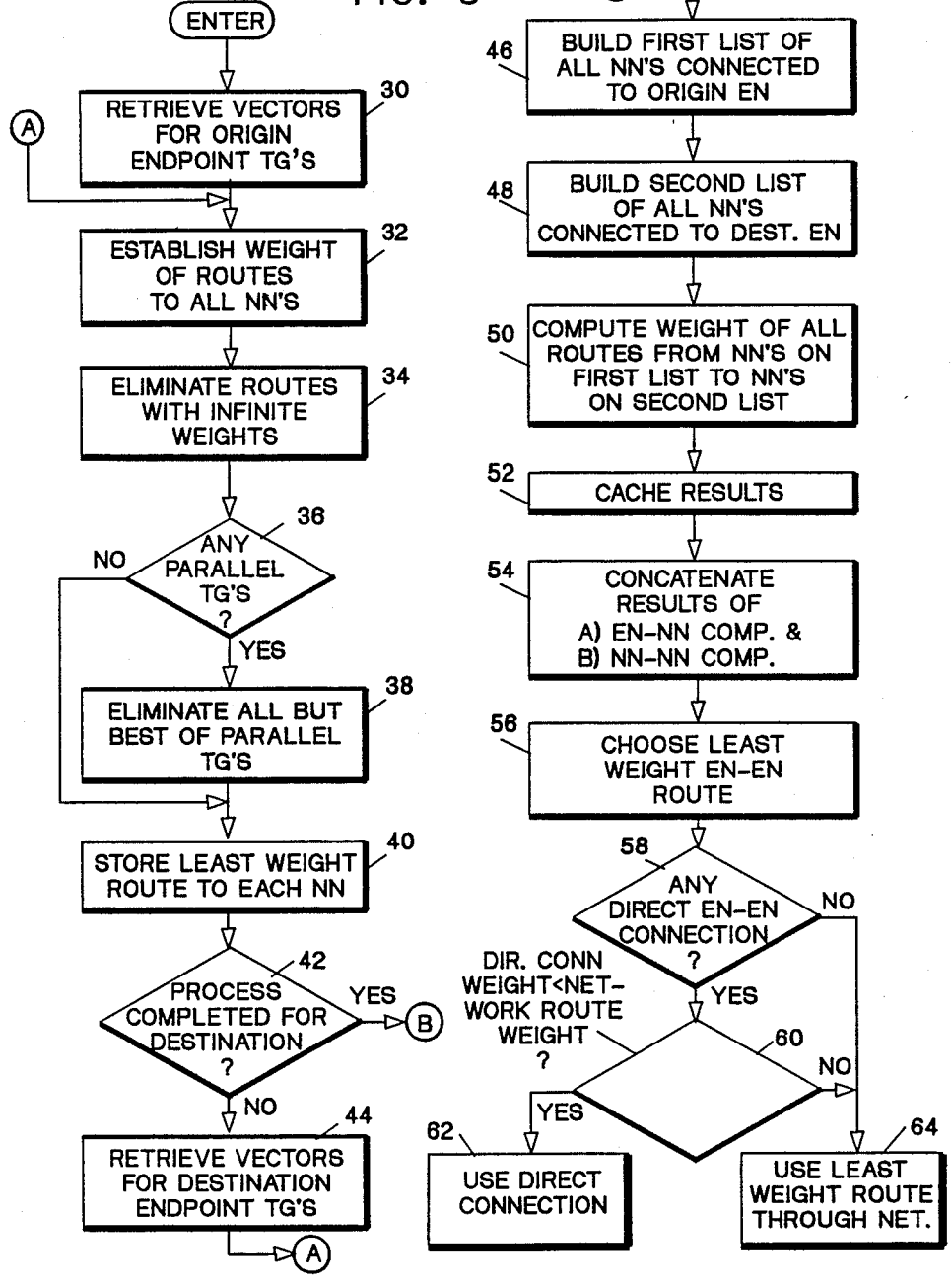
FIG. 3 is a flow chart of operations performed at a network node in performing a route computation in accordance with the present invention.

Network node B then has the information it needs to compute an optimal route through the network between the origin end node EN2 and the destination end node EN6. As mentioned earlier, the computations are staged with the optimal end node-to-network node routes being computed separately from the routes between network nodes. FIG. 3 is a flow chart of operations performed. In the discussion of this figure and elsewhere in this description, it is assumed that only transmission groups suitable for the prospective data exchange (that is, those with the proper class of service) are involved in the computations.

In an operation 30, the serving network node retrieves the vectors for the origin end point transmission groups which, in the network shown in the figure, consists of the pair of parallel transmission groups connecting origin end node EN2 to network node NNB and the single transmission group connecting origin end node EN2 to network node NNA. The retrieved vectors are used in operation 32 to establish the weight of all routes between the origin end node and the network nodes to which that end node is connected. In operation 34, routes with infinite weights (unusable routes) are eliminated. A check 36 is made to determine whether there are any parallel transmission groups from the origin end node to one of the network nodes. If there are, all but the best or least weight of the parallel groups are eliminated in an operation 38. As a result, one optimal route is computed from the origin end node to each network node to which that end node is connected via a finite weight transmission group. The optimal routes, including their weights, are stored for later use in an operation 40.

A check 42 is then made to determine whether the described process has been completed for the transmission groups connecting the destination end node EN6 to its adjacent network nodes. If necessary, the vectors of the transmission groups connecting the destination end node and adjacent network nodes are retrieved in an operation 44 and the computation process including operation 32, 34, 36, 38 and 40 is repeated to determine the optimal route from the destination end node to each network node to which that end node is connected.

Once the end nodes to network nodes optimal routes are calculated, the serving network node builds a first list of network nodes (operation 46). This first list consists of all network nodes connected to the origin end node. The serving network also builds a second list of network nodes in an operation 48. The second list consists of all network nodes connected to the destination end node. The weight of every potential route from the network nodes on the first list to the network nodes on the second list is computed in an operation 50. The algorithms employed to compute the route weights may be conventional in nature. If desired, the results of the route computations can be cached or stored at the serving network node in an operation 52. The cached results would remain available for use in future route computations.

At this point in the process, the serving network node has computed an optimal route from the origin end node to every network node to which it is connected, an optimal route from the destination end node to every network node to which it is connected and optimal routes from every network node connected to the origin end node to every network node connected to the destination end node. To determine the optimal end node-to-end node route through the network, the results of the separate computations are concatenated or combined in an operation 54. The least weight route resulting from the concatenation is chosen in an operation 56 as the optimal end node-to-end node route through the network.

Because there is a possibility that a direct end node-to-end node connection may exist, a check 58 must be made for the presence of such a connection. If such a direct connection is found, the weight assigned to the direct connection is compared to the weight of the optimal route through the network in an operation 60. If the direct connection has a lower weight than the network route, the direct connection is selected in an operation 62. However, if there is no direct connection or if the weight assigned to an existing direct connection is greater than the computed weight for the route through the network, the network route is chosen in an operation 64.

FIG. 4 is a table illustrating the results of route computations within the network. The function of these computations is to select an optimal route from every network node connected to the origin end node to every network node connected to the destination end node. Since there are two network nodes, NNA and NNB, connected to the origin end node EN2 and two network nodes, NND and NNF, connected to the destination end node EN6, there will necessarily be four optimal routes within the network connecting these four network nodes. The optimal routes are computed simply by summing the weights assigned to the nodes and transmission groups on each possible route. For example, the weight assigned to a potential route including network nodes NNA, NNB and NND is assigned a weight equal to the sum of the weights of these three nodes plus the weights assigned to the transmission groups connecting these three nodes.

The potential routes through the network are grouped according to the origin network node and the destination network node. It will be seen that there are three potential routes in the first group; that is, the group having origin network node NNA and destination network node NND. The calculated weights assigned to each of the potential routes is shown in FIG. 4. FIG. 4 also shows that the least weight route in each of these groups is selected for use in computation of a final end node-to-end node least weight route.

The selected routes in each of the four groups appears in the table shown in FIG. 5. To complete the computation of the end node-to-end node route, the weight of the optimal route between the origin end node and each of its network nodes is combined with the weight of the selected routes within the network. For example, the weight of the optimal route from origin end node EN2 to potential origin network node NNA and the weight of the optimal route from destination end node EN6 to network node NND is added to the weight of the optimal route between network nodes NNA and NND. For the weights illustrated, the total weight of this route would have a value of 19. FIG. 5 shows that the least weight route through the network is formed over a path including the single transmission group between EN6 and network node NND, the network node NND itself, the transmission group between network node NND and network node NNB and the lower weighted of transmission groups connecting network node NNB to end node EN2.

Once the route computations have been performed, the serving network node can discard the vectors for the end node transmission groups or allow those vectors to be over written when the next route computation is performed.

While there has been described what is considered to be a preferred embodiment of the invention, variations and modifications in that embodiment will occur to those skilled in the art once they become aware of the basic inventive concepts. For example, the description assumes an end node to end node route. In some cases, the route may extend only from an end node to a network node. The invention is applicable to such a route. Therefore, it is intended that the appended claims shall be construed to include not only the preferred embodiment but all such variations and modifications as fall within the true spirit and scope of the invention.

We claim:

1. A method of enabling a network node to determine an optimal route through a data communications network including end nodes and network nodes, said end nodes and network nodes being interconnected by transmission groups, said method including the steps of:
   receiving from the end nodes information about the characteristics of transmission groups connecting the end nodes to network nodes;
   calculating optimal routes from the end nodes to network nodes using received information;
   calculating optimal routes between network nodes using information stored in a network topology database; and
   combining the results of the above-defined calculating steps to determine the optimal end node-to-end node route.

2. For use in a communications network including end nodes and network nodes, wherein weights are assigned to the various nodes and to transmission groups connecting the nodes as a function of known characteristics of said transmission groups and nodes, a method of determining an optimal route between a first user at an origin end node and a second user at a destination end node, said method comprising the steps of:

calculating the weights of routes from the origin end node to potential origin network nodes;

calculating the weights of routes from the destination end node to potential destination network nodes;

calculating the weights of optimal routes between potential origin network nodes and potential destination network nodes; and concatenating the weights resulting from the above-defined calculating steps to determine an optimal route from the origin end node to the destination end node.

3. A method as defined in claim 2 wherein the step of calculating the weights of routes connecting potential origin and destination network nodes further comprises the steps of:

compiling a first list of potential origin network nodes comprising all network nodes connected to the origin end node;

compiling a second list of potential destination network nodes comprising all network nodes connected to the destination end node; and calculating the weights of optimal routes from all nodes on said first list to all nodes on said second list.

4. A method as defined in claim 3 further including the step of caching the results of the final calculating step for possible use in further route computations.

5. A method as defined in claims 2, 3 or 4 further including the steps of:

determining whether there is a direct connection between the origin end node and the destination end node;

comparing the weight of any said direct connection to the weight of an optimal route through the network; and selecting the direct connection as the optimal connection only where the optimal route through the network has a greater calculating weight.

6. For use in a communications network including end nodes and network nodes, wherein weights are assigned to the various nodes and to transmission groups connecting the nodes as a function of known characteristics of said transmission groups and nodes, a method of enabling a network node serving a first user at an origin end node to determine an optimal route between the first user and a second user at a destination end node when a topology database accessible by said serving network node contains only information about the network nodes and transmission groups interconnecting said network nodes, said method comprising the steps of:

receiving a message at said serving network node from the origin end node, said message including the characteristics of transmission groups connecting said origin end node to network nodes;

storing the characteristics received from said origin end node for use in computing optimal routes from the origin end node to potential origin network nodes before forwarding the message to the destination end node;

receiving a reply message from the destination end node, said message including the characteristics of transmission groups connecting said destination end node to network nodes; and storing the characteristics received from the destination end node for use in computing optimal routes from potential destination network nodes to the destination end node.

* * * * *